US007077745B2

(12) United States Patent
Gomez et al.

(10) Patent No.: US 7,077,745 B2
(45) Date of Patent: Jul. 18, 2006

(54) SLOT MACHINE WITH WIN COMPLETION FEATURE

(75) Inventors: Benjamin T. Gomez, Chicago, IL (US); Joel R. Jaffe, Evanston, IL (US); Alfred Thomas, Las Vegas, NV (US)

(73) Assignee: WMS Gaming Inc., Waukegan, IL (US)

( * ) Notice: Subject to any disclaimer, the term of this patent is extended or adjusted under 35 U.S.C. 154(b) by 0 days.

(21) Appl. No.: 10/447,765

(22) Filed: May 29, 2003

(65) Prior Publication Data

US 2004/0242312 A1 Dec. 2, 2004

(51) Int. Cl.
*A63F 13/00* (2006.01)

(52) U.S. Cl. .......................................................... 463/20

(58) Field of Classification Search ............ 463/16–22, 463/25, 30, 31; 273/143 R See application file for complete search history.

(56) References Cited

U.S. PATENT DOCUMENTS

| | | | | |
|---|---|---|---|---|
| 4,454,670 | A | 6/1984 | Bachmann et al. | 194/350 |
| 4,517,558 | A | 5/1985 | Davids | 340/700 |
| 4,718,672 | A | 1/1988 | Okada | 273/143 R |
| 5,393,061 | A | 2/1995 | Manship et al. | 273/143 R |
| 5,580,055 | A | 12/1996 | Hagiwara | 273/143 R |
| 5,697,843 | A | 12/1997 | Manship et al. | 463/20 |
| 5,752,881 | A | 5/1998 | Inoue | 273/143 R |
| 5,902,184 | A | 5/1999 | Bennett | 463/13 |
| 5,980,384 | A | 11/1999 | Barrie | 463/16 |
| 6,027,115 | A | 2/2000 | Griswold et al. | 273/143 R |
| 6,036,188 | A | 3/2000 | Gomez et al. | 273/118 R |
| 6,038,188 | A | 3/2000 | Akamatsu | 365/226 |
| 6,056,642 | A | 5/2000 | Bennett | 463/20 |
| 6,089,977 | A | 7/2000 | Bennett | 463/20 |
| 6,095,921 | A | 8/2000 | Walker et al. | 463/20 |
| 6,135,884 | A | 10/2000 | Hedrick et al. | 463/20 |
| 6,135,885 | A | 10/2000 | Lermusiaux | 463/20 |
| 6,164,645 | A | 12/2000 | Weiss | 273/138.2 |
| 6,224,482 | B1 | 5/2001 | Bennett | 463/20 |
| 6,251,013 | B1 | 6/2001 | Bennett | 463/13 |
| 6,261,177 | B1 | 7/2001 | Bennett | 463/16 |
| 6,270,411 | B1 | 8/2001 | Gura et al. | 463/20 |
| 6,290,600 | B1 | 9/2001 | Glasson | 463/20 |
| 6,364,766 | B1 | 4/2002 | Anderson et al. | 463/16 |
| 6,368,216 | B1 | 4/2002 | Hedrick et al. | 463/20 |
| 6,375,568 | B1 | 4/2002 | Roffman et al. | 463/26 |
| 6,419,579 | B1 | 7/2002 | Bennett et al. | 463/20 |
| 6,517,432 | B1 | 2/2003 | Jaffe | 463/16 |

(Continued)

FOREIGN PATENT DOCUMENTS

| | | |
|---|---|---|
| EP | 0 060 019 A1 | 9/1982 |

(Continued)

OTHER PUBLICATIONS

"Bigfoot" Product Sheet, Shuffle Master, Inc., 1 page (2000).

(Continued)

*Primary Examiner*—Kim Nguyen
(74) *Attorney, Agent, or Firm*—Jenkens & Gilchrist

(57) ABSTRACT

A method of conducting a wagering game on a gaming machine is disclosed. The wagering game may, for example, be a video reel slot game that includes a plurality of symbols displayed in an array. The plurality of symbols are evaluated to determine a change to one of the symbols that will yield one of a plurality of predefined winning combinations of symbols. The one of the symbols is changed to another of the symbols to form the winning combination, and an award is awarded for the winning combination.

27 Claims, 11 Drawing Sheets

U.S. PATENT DOCUMENTS

| | | | | |
|---|---|---|---|---|
| 6,517,433 | B1 | 2/2003 | Loose et al. | 463/20 |
| 6,551,187 | B1 | 4/2003 | Jaffe | 463/20 |
| 2002/0052233 | A1* | 5/2002 | Gauselmann | 463/20 |
| 2002/0068623 | A1* | 6/2002 | Gauselmann | 463/20 |
| 2003/0060276 | A1* | 3/2003 | Walker et al. | 463/25 |
| 2003/0092480 | A1* | 5/2003 | White et al. | 463/20 |
| 2003/0236116 | A1* | 12/2003 | Marks et al. | 463/16 |
| 2004/0097280 | A1* | 5/2004 | Gauselmann | 463/16 |

FOREIGN PATENT DOCUMENTS

| | | | |
|---|---|---|---|
| EP | 0789 338 | A1 | 8/1997 |
| GB | 2 097 160 | A | 10/1982 |
| GB | 2097160 | * | 10/1982 |
| GB | 2 124 505 | A | 2/1984 |
| GB | 2 349 494 | A | 11/2000 |
| JP | 10-071228 | | 3/1998 |
| JP | 2002-262738 | | 9/2000 |
| JP | 2002-113150 | | 4/2002 |
| WO | WO 99/53454 | A1 | 10/1999 |
| WO | WO 99/64997 | A1 | 12/1999 |
| WO | WO 00/32286 | A1 | 6/2000 |

OTHER PUBLICATIONS

"Big Games Safari" Product Sheet, IGT, 24 pages (2000).
"Cabby Cash™" Product Sheet, Anchor Gaming, 2 pages (2000).
"Congo Quest™" Product Sheet, Anchor Gaming, 2 pages (2000).
"Fishin' Buddies™" Product Sheet, Anchor Gaming, 2 pages (2000).
Legato, Frank, "The Full Monty," Strictly Slots, pp. 48-50 (Jun. 1999).
"Goooaal!" Product Sheet, Bally Gaming, Inc., 2 pages (2000).
"Great Whites" Product Sheet, VLC, Inc., 2 pages (2000).
"Jackpot Stampede Deluxe™" Product Sheet, WMS Gaming Inc., 2 pages (1997).
"Loaded Dice" Product Sheet, Konami Gaming, 2 pages (2000).
"Neptune's Pearls" Product Sheet, Unidesa Gaming, 4 pages (1998).
"Penguin Pays" Product Sheet, Aristocrat Incorporated, 2 pages (1998).
"Stroke Of Luck™" Product Sheet, WMS Gaming Inc., 2 pages (1997).
"Wild Cougar" Article, Strictly Slots, p. 44 (Feb. 1999).
"Yahtzee® Brand Video Game" Product Brochure, Hasbro, Inc., 2 pages (2000).

* cited by examiner

SLOT MACHINE WITH WIN COMPLETION FEATURE

FIELD OF THE INVENTION

The present invention relates generally to gaming machines and, more particularly, to a gaming machine including a win completion feature.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning each machine is roughly the same (or believed to be the same), players are most likely to be attracted to the most entertaining and exciting of the machines. Shrewd operators consequently strive to employ the most entertaining and exciting machines available because such machines attract frequent play and hence increase profitability to the operator. Accordingly, in the competitive gaming machine industry, there is a continuing need for gaming machine manufacturers to produce new types of games, or enhancements to existing games, which will attract frequent play by enhancing the entertainment value and excitement associated with the game.

One concept that has been employed to increase the entertainment value of a slot machine is a “wild” symbol that substitutes for other basic reel symbols. Often times the wild symbol will randomly appear on a selected pay line along with a series of other matching symbols to complete a win. The addition of a wild symbol or symbols to the plurality of basic reel symbols may increase the perceived chances of a win and enhance the entertainment value of the machine. Wild symbols have existed as a standard gaming feature for many years and frequent players of slot machines view wild symbols as routine.

SUMMARY OF THE INVENTION

The present invention provides a method of conducting a wagering game on a gaming machine. The wagering game may, for example, be a video reel slot game that includes a plurality of symbols displayed in an array. The plurality of symbols are evaluated to determine a change to one of the symbols that will yield one of a plurality of predefined winning combinations of symbols. The one of the symbols is changed to another of the symbols to form the winning combination, and an award is awarded for the winning combination.

BRIEF DESCRIPTION OF THE DRAWINGS

The foregoing and other advantages of the invention will become apparent upon reading the following detailed description and upon reference to the drawings in which.

Figure 1:
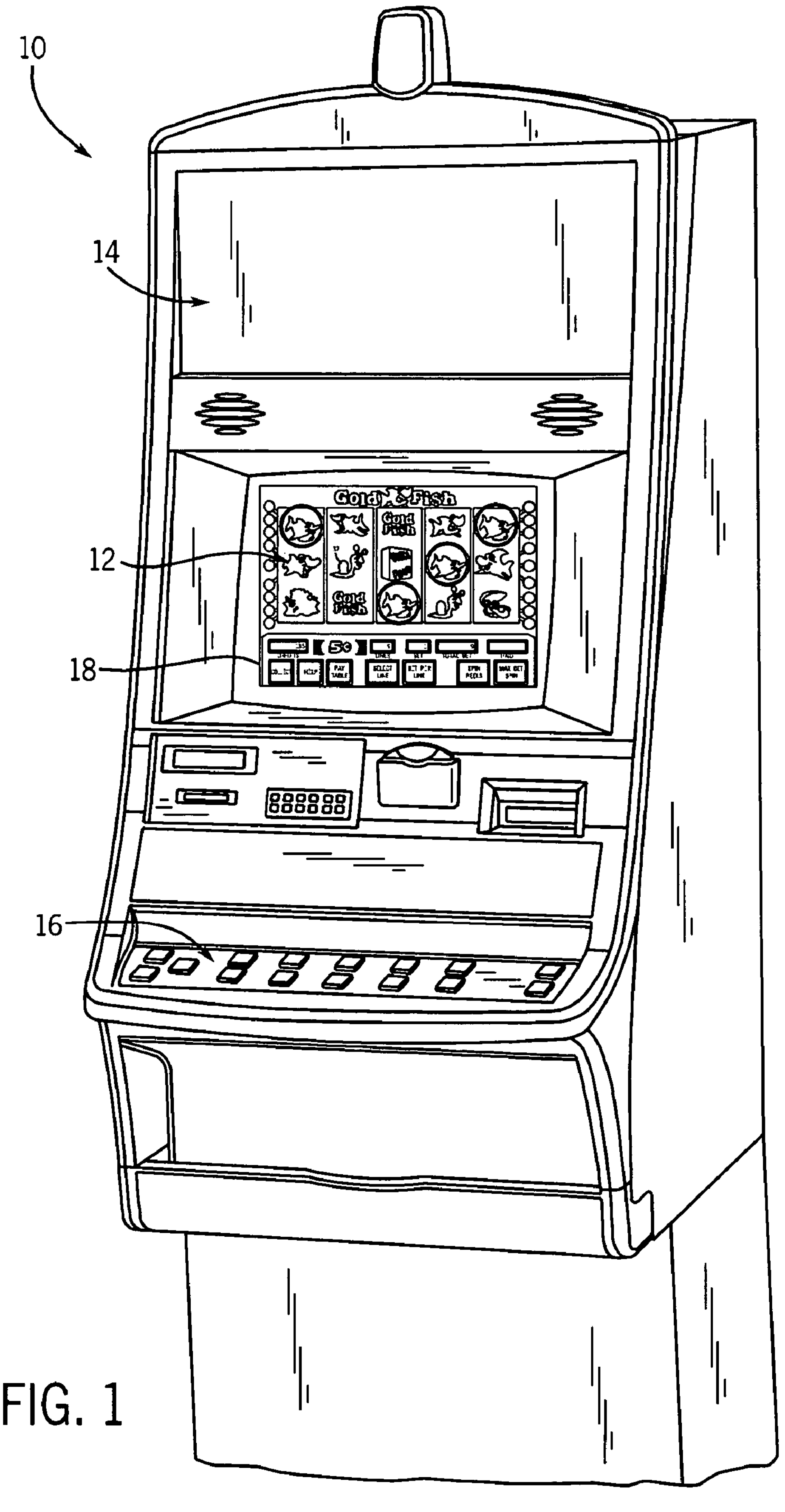
FIG. 1 is a perspective view of a gaming machine embodying the present invention.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents, and alternatives falling within the spirit and scope of the invention as defined by the appended claims.

DESCRIPTION OF SPECIFIC EMBODIMENTS

FIG. 1 depicts a gaming machine 10 operable to conduct a video reel slot game. In operation, the gaming machine receives a wager from a player to purchase a “play” of the game. In a “play” of the game, the gaming machine generates at least one random event using a random number generator (RNG) and provides an award to the player for a winning outcome of the random event. To portray the random event and outcome to the player, the gaming machine includes a video display 12. For a video reel slot game, the video display 12 portrays a plurality of simulated reels that are rotated and stopped to place symbols on the reels in visual association with one or more pay lines.

The video display 12 is preferably in the form of a liquid crystal display (LCD), cathode ray tube (CRT), plasma, or other type of video display known in the art. The display 12 preferably includes a touch screen overlaying the monitor. In the illustrated embodiment, the gaming machine 10 is an “upright” version in which the display 12 is oriented vertically relative to the player. Alternatively, the gaming machine may be a “slant-top” version in which the display 12 is slanted at about a thirty-degree angle toward the player of the gaming machine 10. In addition to the display 12, the gaming machine 10 may include a secondary display 14 for displaying additional game information such as a bonus feature.

Figure 2:
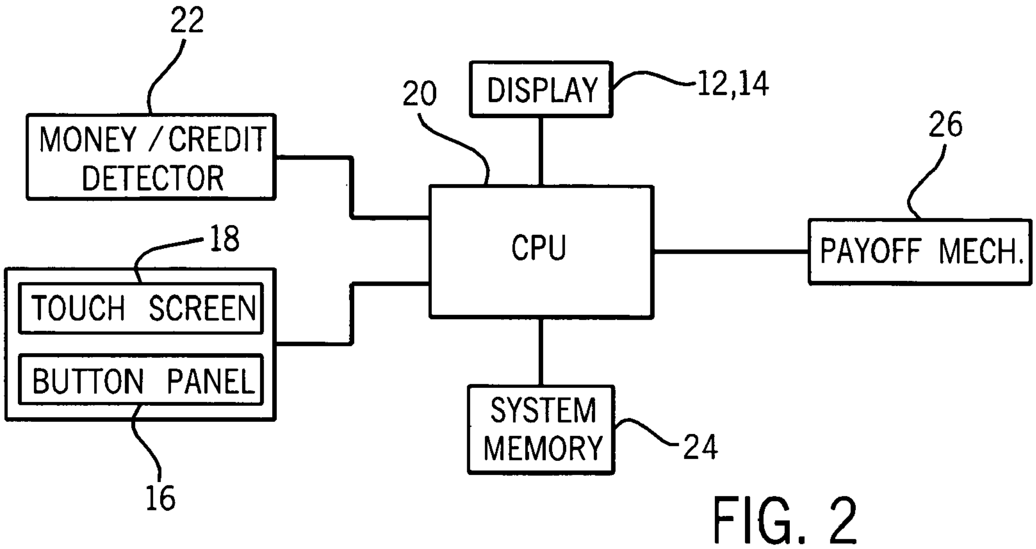
FIG. 2 is a block diagram of a control mechanism used for communication between interface components, a main processor, and display units.

FIG. 2 is a block diagram of a control system suitable for operating the gaming machine. Money/credit detector 22 signals a central processing unit (CPU) 20 when a player has inserted money or played a number of credits. The money may be provided by coins, bills, tickets, coupons, cards, etc. Using a button panel 16 and/or the touch screen 18, the player may select any variables associated with the wagering game and place his/her wager to purchase a play of the game. In a play of the game, the CPU 20 generates at least one random event using a random number generator (RNG) and provides an award to the player for a winning outcome of the random event. The CPU 20 operates the display 12 to represent the random event(s) and outcome(s) in a visual form that can be understood by the player. In addition to the CPU 20, the control system may include one or more additional slave control units for operating one or more of the displays 12 and 14.

System memory 24 stores control software, operational instructions and data associated with the gaming machine. In one embodiment, the system memory 24 comprises a separate read-only memory (ROM) and battery-backed random-access memory (RAM). However, it will be appreciated that the system memory 24 may be implemented on any of several alternative types of memory structures or may be implemented on a single memory structure. A payoff mechanism 26 is operable in response to instructions from the CPU 20 to award a payoff to the player. The payoff may, for example, be in the form of a number of credits. The number of credits is determined by one or more math tables stored in the system memory 24.

Referring back to FIG. 1, to play the reel slot game, a player selects a number of pay lines and places a wager on the selected lines using the button panel 16 and/or the touch screen 18. In response to pressing a "Spin Reels" button, the CPU spins and randomly stops the plurality of simulated reels on the display 12 to place symbols on the reels in visual association with the pay lines. Other mechanisms, such as a handle, may be used to set the reels in motion. The number of reels and pay lines may be varied to be more or less than what is illustrated. The CPU 20 uses a random number generator to select a game outcome (e.g., "basic" game outcome) corresponding to a particular set of reel "stop positions." The CPU 20 then causes each of the reels to stop at the appropriate stop position. Symbols are displayed on the reels to graphically illustrate the reel stop positions and indicate whether the stop positions of the reels represent a winning game outcome.

Winning basic game outcomes (e.g., symbol combinations resulting in payment of coins or credits) are identifiable to the player by a pay table. The pay table may be affixed to the machine 10 and/or displayed by the display 12 in response to a command by the player (e.g., by pressing a "Pay Table" key). A winning basic game outcome occurs when the symbols appearing on the reels along a pay line correspond to one of the winning combinations on the pay table. A winning combination, for example, could be a number of matching symbols along an active pay line, where the award is greater as the number of matching symbols along the pay line increases. If the displayed symbols stop in a winning combination, the game credits the player an amount corresponding to the award in the pay table for that combination multiplied by the number of credits wagered on the active pay line. The player may collect the amount of accumulated credits by pressing a "Collect" key.

Figure 3:
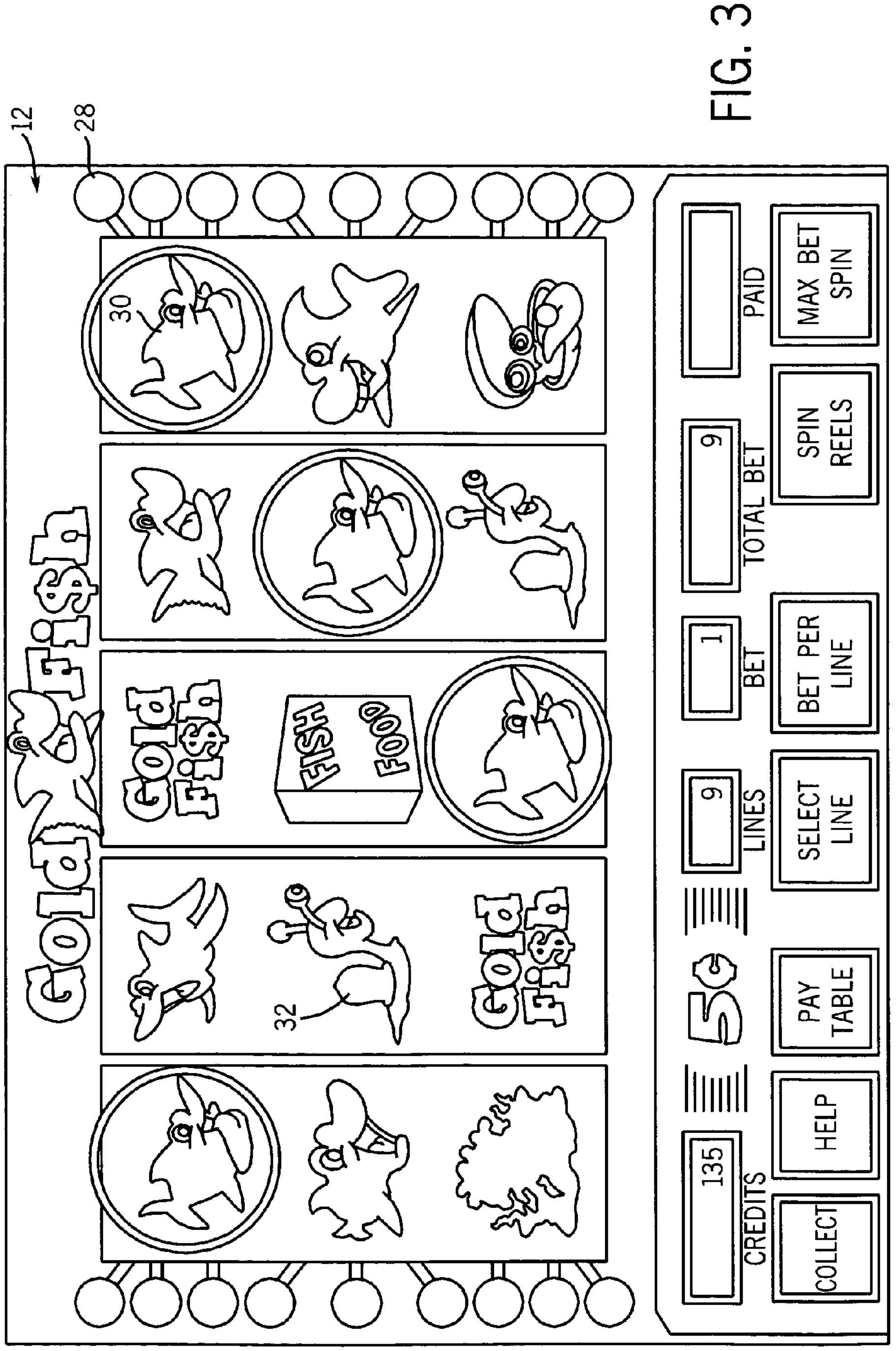
FIG. 3 is a display image associated with a basic slot game and showing a symbol combination for triggering a win completion feature.
Figure 4A:
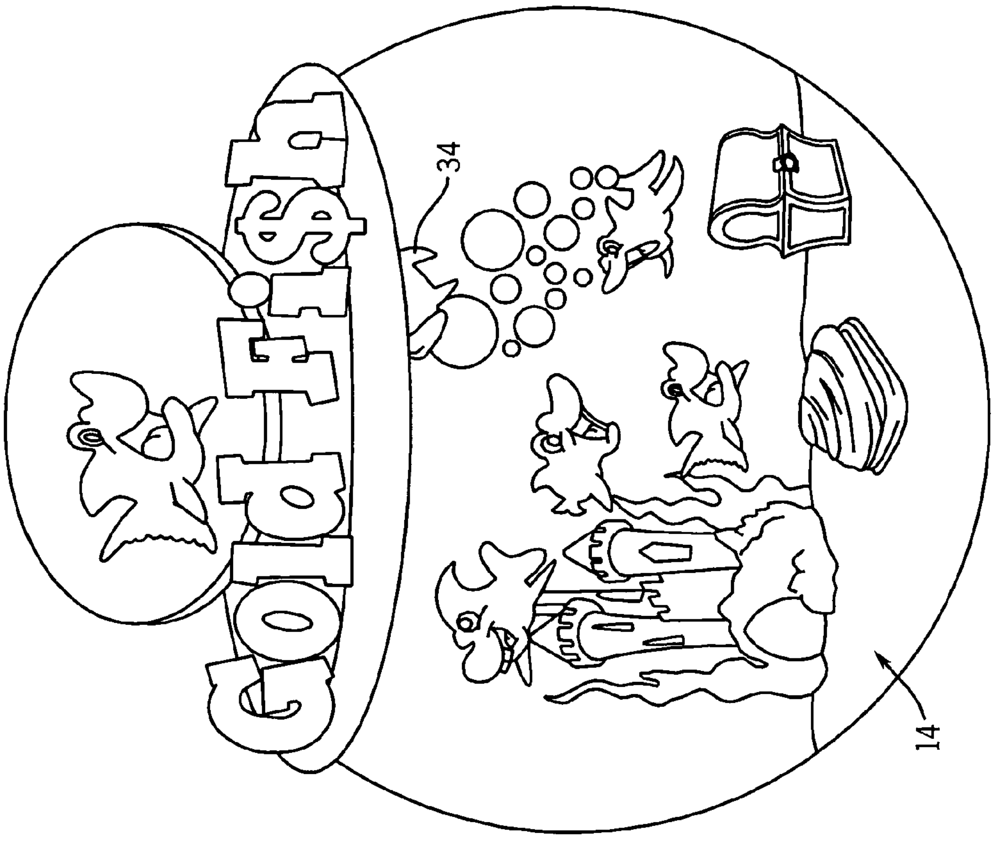
FIGS. 4 through 10 are additional display images associated with the win completion feature.
Figure 4B:
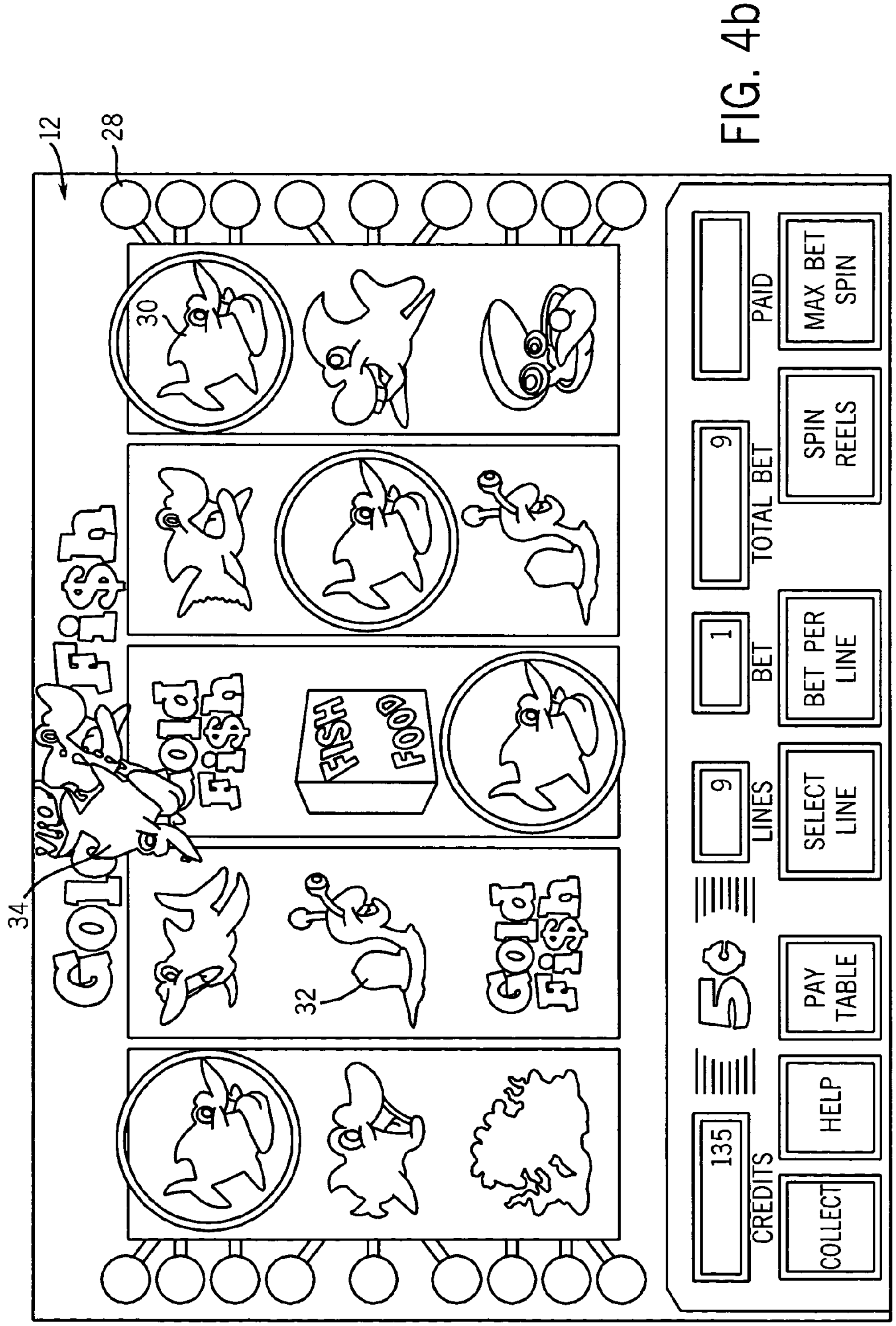

The present invention provides a feature to create a winning outcome after the reels have stopped and reveal an outcome short of a win. For example, in a five-reel slot game where five identical symbols along an active pay line signify a win, the present invention provides a method for automatically adding the fifth symbol when only four are presented along the active pay line. Referring to FIG. 3, a reel spin in a five-reel video slot game entitled "Gold Fi$h" results in a series of symbols 30 that nearly represent a "win" along pay line 28. A symbol in the middle position 32 of the second reel is not the same as the other symbols along pay line 28; therefore the player is one symbol short of a win. The "Gold Fi$h" game provides a method for completing the win by automatically inserting the final required symbol into the remaining position. The remaining position is effectively transformed or converted into the required symbol.

FIGS. **4*a* and 4*b* show the displays 12, 14 from the "Gold Fi$h" game. The game uses the secondary (top) display 14 to assist in modifying the outcome in the main display 12 in an entertaining fashion. To complete the winning combination along pay line 28, a gold fish 34 representing the last symbol required for the win "swims" to the top of the fish bowl of the display 14 and "leaps" into the middle position 32 of the second reel on the display 12**. As will be appreciated by those of ordinary skill in the art, a variety of entertaining methods may be deployed to implement the win completion feature.

Figure 5:
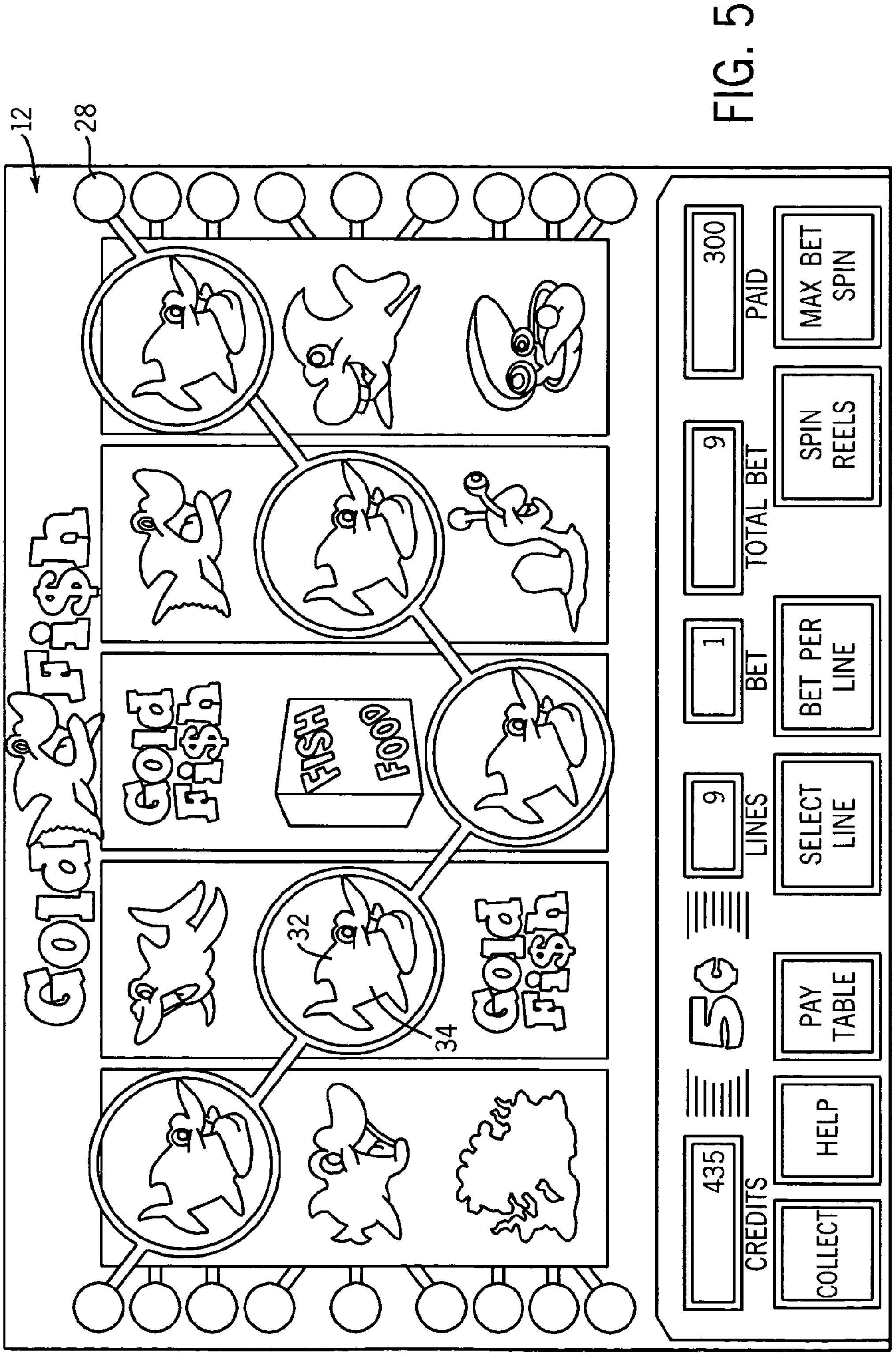

FIG. 5 shows the result of the completed win on the display 12. The fish 34 from the top display 14 has replaced the symbol originally in position 32 thus completing the winning combination on pay line 28.

Figure 6:
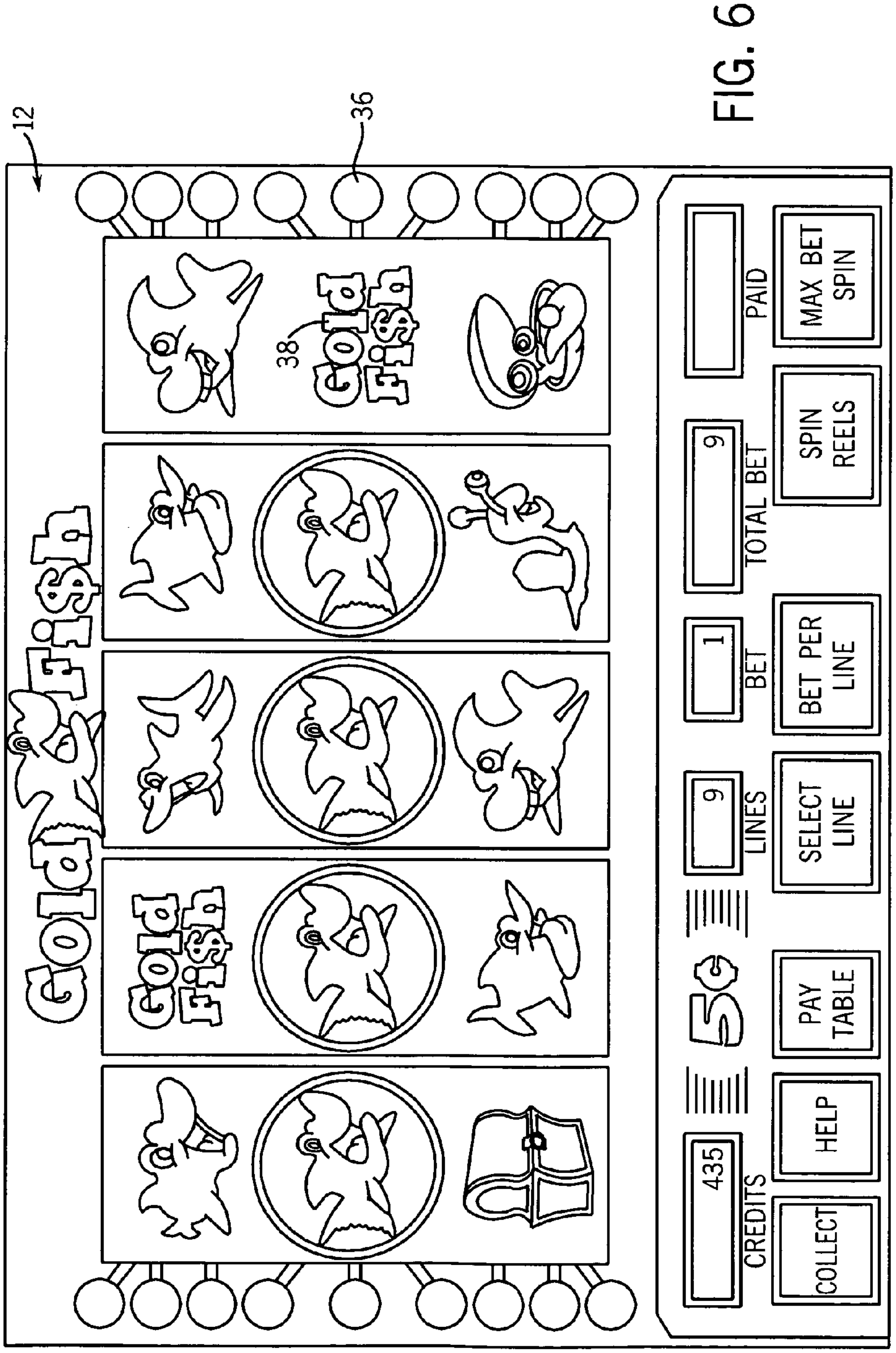

FIG. 6 shows another situation where the win completion feature is used. The symbol combination on a middle, horizontal pay line 36 is missing a single, same symbol in the middle position 38 of the fifth reel. Although not illustrated, the win completion feature would automatically replace or transform the dissimilar symbol in this middle position 38 and replace it with a symbol matching the others along the pay line 36.

Figure 7:
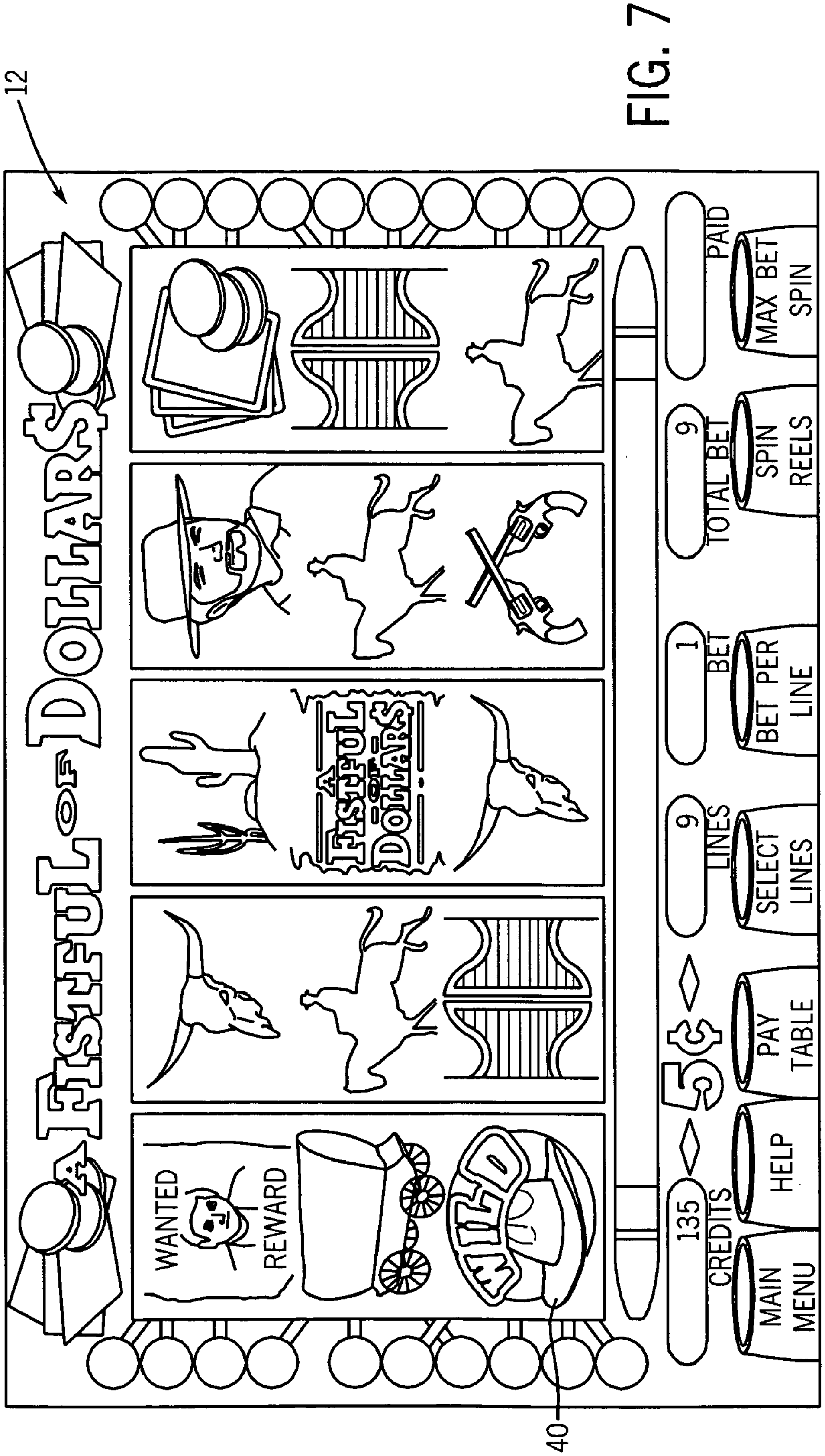

FIG. 7 shows another example of a reel slot game entitled "A Fistful of Dollar$" with a win completion feature. In this example, a reel spin results in the appearance of a "wild" symbol 40 in the bottom position of the first reel on display 12, thereby triggering a symbol-changing bonus.

Figure 8:
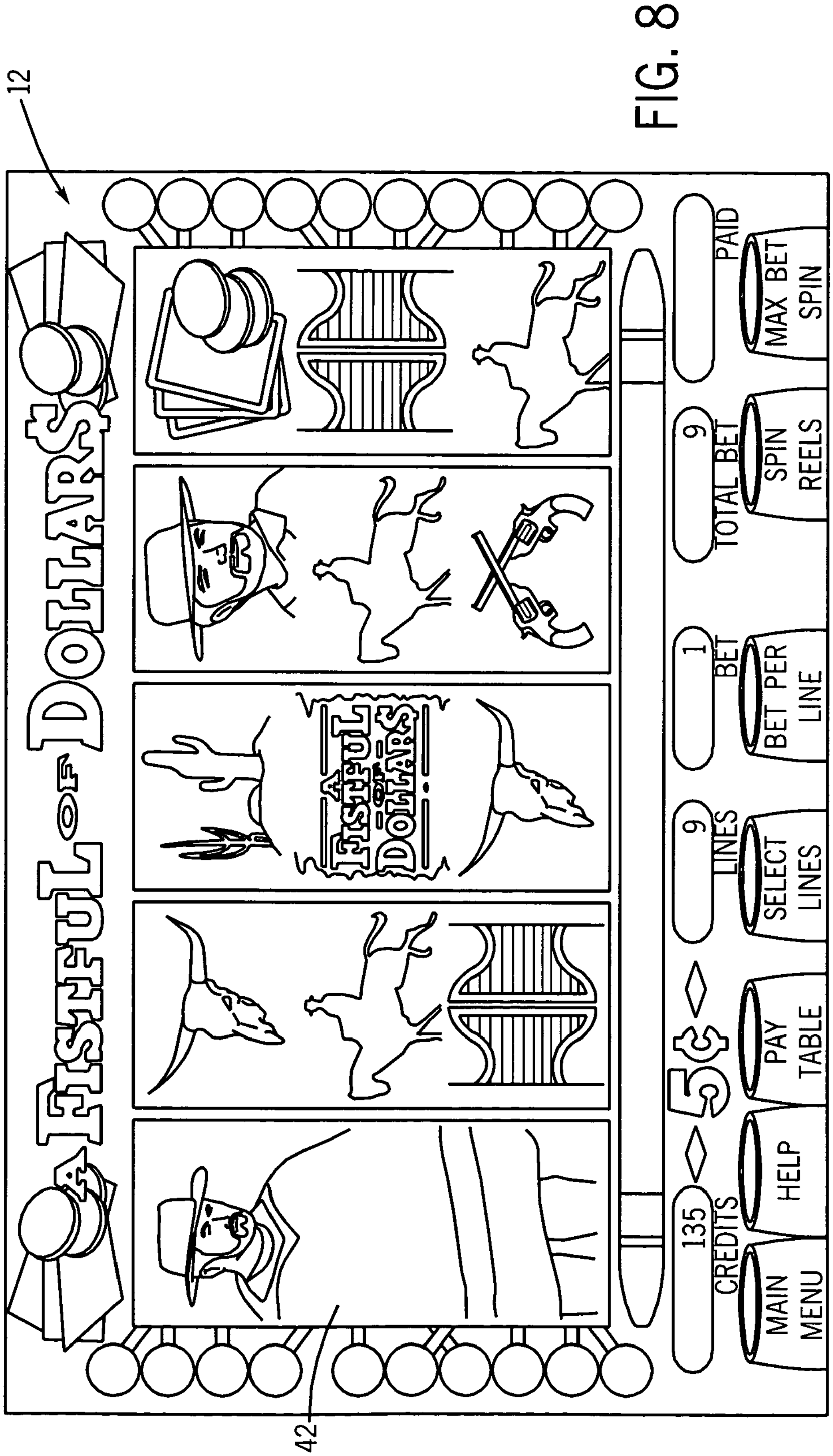

In FIG. 8, a character 42 appears in the first reel (making the entire first reel "wild") to "look over" the reel symbols and "determine" which single symbol to change to create the highest paying winning combination according to the pay table and the pay line(s) activated by the player.

Figure 9:
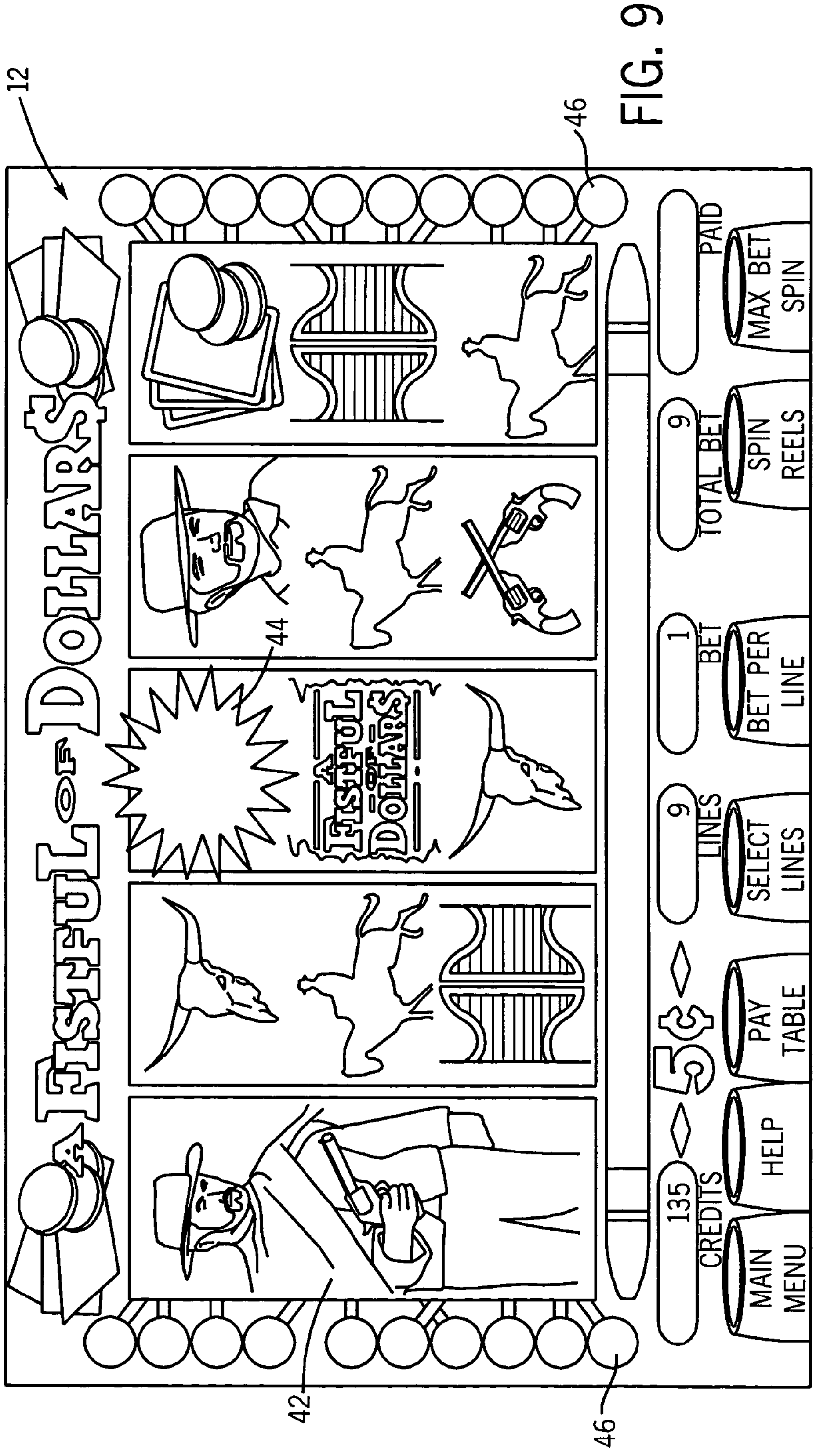

FIG. 9 depicts a symbol being changed. The display 12 shows a group of symbols along a pay line 46 with all but one symbol alike. The character 42 "shoots" the symbol in the top position 44 of the third reel, causing it to change.

Figure 10:
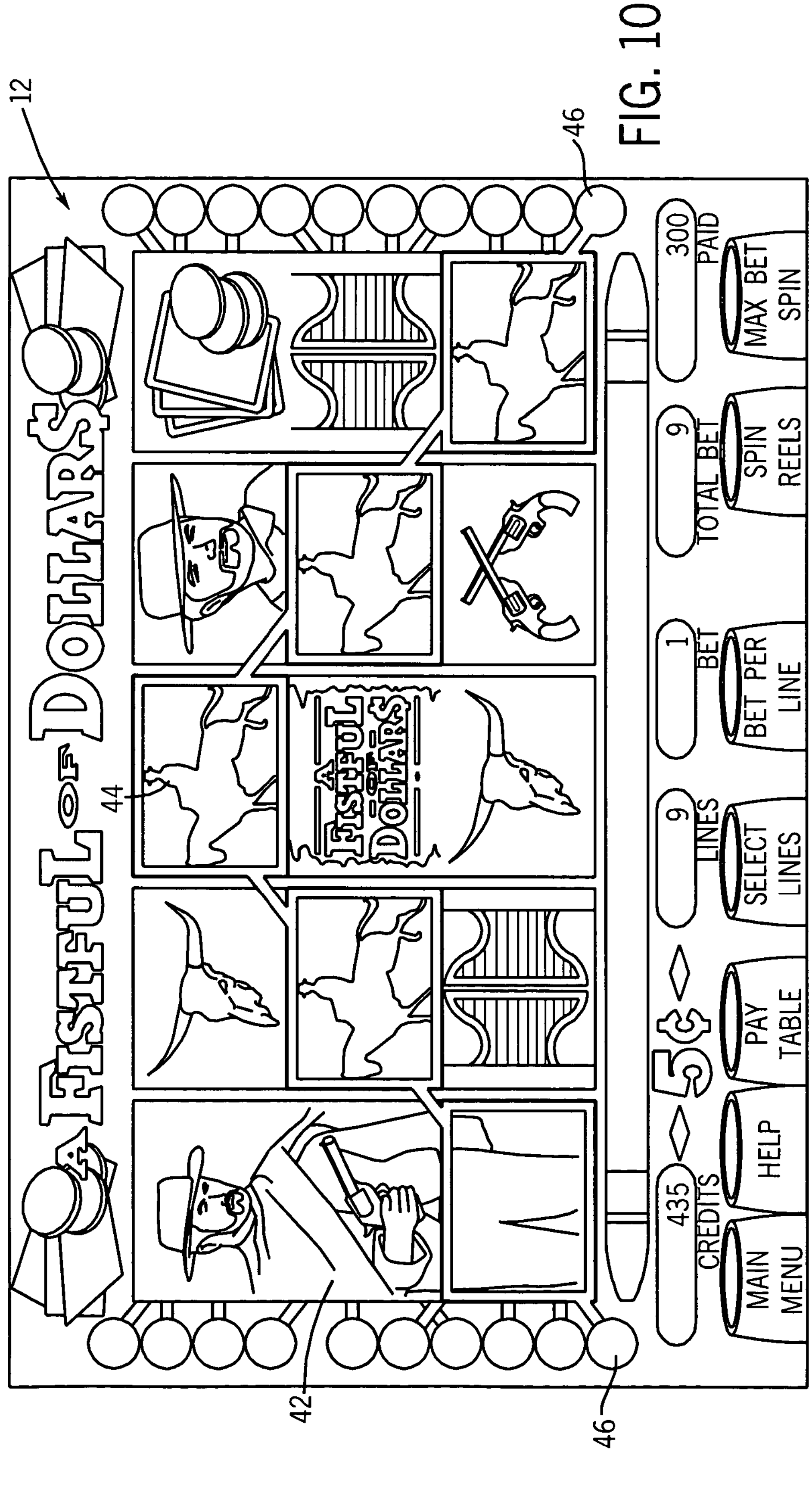

FIG. 10 shows the new winning combination along pay line 46. The symbol in the top position 44 of the third reel is now identical to the other symbols along the pay line 46 and the outcome of the initial spin is now a winning combination.

The event or events required to trigger the win completion feature can be any method appropriate for the game, the wager, and/or the pay lines selected. For example, in the "Gold Fi$h" game, the player "purchases" the win completion feature. In other games, the win completion feature may be enabled when a maximum bet on all pay lines is selected by the player, may be triggered by a special "wild" symbol, or may be an automatic feature presented as part of regular game play. The win completion may also be a random event or part of a game theme.

The win completion feature preferably determines the symbol or symbols to change based on the highest paying winning combination that could be presented on the display at the time the feature is invoked. The feature only changes a symbol or symbols on the pay lines activated by the player. Multiple pay line win completions may also be supported with each line possibly requiring an additional pay. While the present invention has been described with reference to one or more particular embodiments, those skilled in the art will recognize that many changes may be made thereto without departing from the spirit and scope of the present invention.

For example, the number of symbols that are changed to complete a single win following a reel spin is not limited to one, i.e., more than one symbol may be changed to complete a win.

As noted above, the number of wins that are completed following a reel spin is not limited to one, i.e., more than one win may be completed. Alternatively, when multiple wins may be completed following a reel spin, only the highest paying win may be completed.

If an initial pay to receive the win completion feature is required, the cost and corresponding pay out for the win can vary according to the requirements of the game. If the win completion feature is triggered by a "wild" symbol, the number of "wild" symbols or the position on the reels can vary according the requirements of the game. In general, the triggering mechanism for the win completion feature is not limited to the examples provided here.

The display 12 on which the reels are implemented may be mechanical instead of video. If the display 12 is mechanical, the reels are physical and rotatably driven by stepper motors. The win completion feature could be implemented on a mechanical reel slot machine with the change of the dissimilar symbol occurring by re-spinning the reel or reels with the dissimilar symbol to create the winning combination. Another method for implementing the win completion feature on a mechanical reel slot machine would be to deploy an overlay device placed on top of the viewing area of the mechanical reels. The change to the symbol would be displayed on the overlay device in front of the dissimilar symbol, thereby blocking the dissimilar symbol from the player's view. The overlay device could be a transparent video screen, a mechanical mechanism that allows a physical image to slide in front of the dissimilar symbol, or other device.

Although the illustrated wagering game is a reel slot game, the win completion feature may be applied to other wagering games such as poker.

Each of these embodiments and obvious variations thereof is contemplated as falling within the spirit and scope of the claimed invention, which is set forth in the following claims.

The invention claimed is:

1. A method of conducting a wagering game, comprising:
receiving a wager to play the wagering game;
displaying a plurality of symbols on a display;
evaluating, by a processor, the plurality of symbols to determine a change to one of the symbols that will yield one of a plurality of predefined winning combinations of symbols, the evaluating including identifying a predefined winning combination of symbols;
changing the one of the symbols to a changed symbol that was not displayed on the display prior to the changing to form the predefined winning combination of symbols on the display; and
awarding an award for the predefined winning combination.

2. The method of claim 1, wherein the displaying step includes displaying the plurality of symbols in an array.

3. The method of claim 2, wherein the displaying step includes rotating and stopping a plurality of symbol-bearing reels to place certain symbols on the reels in the array.

4. The method of claim 2, wherein the plurality of symbols are displayed in the visual association with one or more pay lines, the predefined winning combination being along one of the pay lines.

5. The method of claim 1, wherein the evaluating step occurs in response to a triggering event.

6. The method of claim 5, wherein the triggering event includes at least one triggering symbol included among the plurality of symbols.

7. The method of claim 5, wherein the triggering event includes an additional or maximum wager.

8. The method of claim 1, wherein the evaluating step includes evaluating the plurality of symbols to determine a change to one of the symbols that will yield a highest paying predefined winning combination of symbols.

9. The method of claim 1, wherein the displaying step includes displaying the plurality of symbols on a video display, and wherein the changing step includes transforming the one of the symbols to the changed symbol.

10. The method of claim 1, further including displaying the changed symbol on a second display prior to displaying the changed symbol on the display, the second display being physically separate from the display.

11. A method of conducting a reel slot game, comprising:
receiving a wager to play the reel slot game;
rotating a plurality of reels to place symbols on the reels in an array, wherein the array is displayed on a display;
evaluating, in response to a triggering event, the array to determine a change to one of the symbols that will yield one of a plurality of predefined winning combinations of symbols, the triggering event being an additional or maximum wager made by a player, the evaluating including identifying a predefined winning combination of symbols;
changing the one of the symbols to a second symbol to form the predefined winning combination of symbols on the display and only displaying the second symbol on the display after the evaluating of the array has occurred; and
awarding an award for the predefined winning combination.

12. The method of claim 11, wherein the triggering event includes at least one triggering symbol included among the plurality of symbols.

13. The method of claim 11, wherein the symbols in the array are displayed in visual association with one or more pay lines, the predefined winning combination being along one of the pay lines.

14. The method of claim 11, wherein the evaluating step includes evaluating the array to determine a change to one of the symbols that will yield a highest paying predefined winning combination of symbols.

15. The method of claim 11, wherein the reels are simulated on a video display, and wherein the changing step includes transforming the one of the symbols to the second symbol.

16. The method of claim 11, wherein the evaluating is performed by a processor.

17. A gaming apparatus for conducting a wagering game, comprising:
a display for displaying a plurality of symbols, wherein the display is a video display; and
a processor for
evaluating the plurality of symbols to determine a change to one of the symbols that will yield one of a plurality of predefined winning combinations of symbols, the evaluating including identifying a predefined winning combination of symbols;
causing the display to transform the one of the symbols to a different symbol to form the predefined winning combination of symbols on the display, the different symbol not being presented before the transformation occurs; and
awarding an award for the predefined winning combination.

18. The apparatus of claim 17, wherein the display displays the plurality of symbols in an array.

19. The apparatus of claim 18, wherein the display displays a plurality of symbol-bearing reels that are rotated and stopped to place certain symbols on the reels in the array.

20. The apparatus of claim 18, wherein the display displays the plurality of symbols in visual association with one or more pay lines, the predefined winning combination being along one of the pay lines.

21. The apparatus of claim 17, wherein the processor evaluates the plurality of symbols in response to a triggering event.

22. The apparatus of claim 21, wherein the triggering event includes at least one triggering symbol included among the plurality of symbols.

23. The apparatus of claim 21, wherein the triggering event includes an additional or maximum wager.

24. The apparatus of claim 17, wherein the processor evaluates the plurality of symbols to determine a change to one of the symbols that will yield a highest paying predefined winning combination of symbols.

25. A method of conducting a wagering game, comprising:

receiving a wager to play the wagering game;

displaying a plurality of symbols on a display;

evaluating, by a processor, the plurality of symbols to determine whether a change of a single one of the displayed symbols will result in a one of a plurality of predefined winning combinations of symbols, the evaluating including identifying a predefined winning combination of symbols;

changing the single one of the symbols to a changed symbol to form the predefined winning combination of symbols on the display, and only displaying the changed symbol on the display after the evaluating of the plurality of symbols has occurred, the changing occurring in response to an additional or maximum wager; and awarding an award for the predefined winning combination.

26. A method of conducting a wagering game, comprising:

receiving a wager to play the wagering game;

displaying a plurality of symbols on a video display;

evaluating the plurality of symbols to determine a change to one of the symbols that will yield one of a plurality of predefined winning combinations of symbols, the evaluating including identifying a predefined winning combination of symbols;

transforming the one of the symbols to a different symbol to form the predefined winning combination of symbols on the display, the different symbol not being displayed on the video display prior to the transforming;

maintaining the displaying of all of the symbols except the one different symbol the change of which yields the predefined winning combination of symbols; and awarding an award for the predefined winning combination.

27. A method of conducting a wagering game, comprising:

receiving a wager from a player to play the wagering game;

offering the player a win-completion feature for an additional wager;

displaying a plurality of symbols on a first display;

evaluating the plurality of symbols to determine a change to one of the symbols that will yield one of a plurality of predefined winning combinations of symbols, the evaluating including identifying a predefined winning combination of symbols;

displaying a second symbol on a second display, the second display being physically separate from the first display;

in response to the player selecting the win-completion feature, changing the one of the symbols to the second symbol after the second symbol has been displayed on the second displays, the second symbol being part of the predefined winning combination of symbols; and awarding an award for the predefined winning combination.

* * * * *